US012169393B2

(12) United States Patent
Lagorgette

(10) Patent No.: US 12,169,393 B2

(45) Date of Patent: Dec. 17, 2024

(54) AUTOMATIC TIME CORRECTION IN A WATCH

(71) Applicant: ETA SA Manufacture Horlogère Suisse, Grenchen (CH)

(72) Inventor: Pascal Lagorgette, Bienne (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 840 days.

(21) Appl. No.: 17/320,583

(22) Filed: May 14, 2021

(65) Prior Publication Data

US 2021/0397137 A1 Dec. 23, 2021

(30) Foreign Application Priority Data

Jun. 18, 2020 (EP) ..................................... 20180687

(51) Int. Cl.
*G04G 5/00* (2013.01)
*G04C 3/14* (2006.01)

(52) U.S. Cl.
CPC *G04G 5/00* (2013.01); *G04C 3/14* (2013.01)

(58) Field of Classification Search
CPC ................................... G04G 5/00; G04C 3/14
See application file for complete search history.

(56) References Cited

U.S. PATENT DOCUMENTS

2005/0105401 A1 5/2005 Akahane et al.
2009/0180356 A1* 7/2009 Fujisawa ................. G01S 19/14 368/47
2014/0086021 A1* 3/2014 Baba ...................... G04R 20/04 368/47
2016/0313699 A1 10/2016 Miyahara
2017/0255170 A1 9/2017 Morohoshi et al.
2018/0203420 A1 7/2018 Morohoshi et al.
2018/0373206 A1* 12/2018 Morohoshi ............ G04R 20/04
2019/0049904 A1 2/2019 Lagorgette et al.
2019/0227497 A1 7/2019 Matsuoh

FOREIGN PATENT DOCUMENTS

EP 3 211 491 A1 8/2017
JP 2002-257956 9/2002
JP 2005-265833 A 9/2005

(Continued)

OTHER PUBLICATIONS

European Search Report issued Oct. 15, 2020 in European Application 20180687.4 filed Jun. 18, 2020 (with English Translation of Categories of Cited Documents), 3 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A method for automatically correcting the time and/or the date for a self-correcting watch including at least one receiving member, at least one detecting member, and at least one processing unit for implementing the correction method. The correction method includes at least one step of receiving at least one datum, at least one step of detecting the wrong time and/or the wrong date and at least one step of correcting the time.

5 Claims, 2 Drawing Sheets

(56) References Cited

FOREIGN PATENT DOCUMENTS

| | | | | |
|---|---|---|---|---|
| JP | 2016-206057 | A | | 12/2016 |
| KR | 20080114332 | A | * | 12/2008 |

OTHER PUBLICATIONS

Notice of the Reason for Refusal issued Jun. 21, 2022, in Japanese Patent Application No. 2021-088982 (with English language translation), 8 pages.

Korean Office Action issued on Oct. 12, 2023 in Korean Patent Application No. 10-2021-0078984 (with English translation), 13 pages.

* cited by examiner

AUTOMATIC TIME CORRECTION IN A WATCH

CROSS-REFERENCE TO RELATED APPLICATION

This application claims priority to European Patent Application No. 20180687.4 filed on Jun. 18, 2020, the entire disclosure of which is hereby incorporated herein by reference.

TECHNICAL FIELD

The present invention relates to electronic watches and more particularly to quartz watches provided with a date.

TECHNOLOGICAL BACKGROUND

Commercially available analogue quartz watches can only be set by the user. However, the user does not know whether the time he/she is setting is before or after noon, which causes the date to change inappropriately.

Solutions exist that call for the use of a multitude of sensors, which increases the production cost, the production time and the failure probability.

SUMMARY OF THE INVENTION

To this end, the present invention proposes overcoming all or part of the aforementioned drawbacks by means of a correction method for a self-correcting watch; said self-correcting watch comprising at least one receiving member, at least one detecting member and at least one processing unit for implementing said correction method; said correction method comprising at least one:

- Receipt of at least one datum by said at least one receiving member; said at least one datum comprising at least one period of the day from among a first period and a second period;
- Detection of a passing of time between said first period and said second period by said at least one detecting member;
- Calculation of a difference between said time and said at least one received datum;
- Correction of said time as a function of the result of said difference by said at least one processing unit.

Thanks to this disposition, the date and/or the time of said self-correcting watch can be corrected.

According to one embodiment, said at least one datum comprises a time in a 24-hour time system or in a 12-hour time system.

According to one embodiment, said first period is comprised between midnight and noon, or is greater than or equal to "12:00 AM" and strictly less than "12:00 PM" and/or said second period is comprised between noon and midnight or is greater than or equal to "12:00 PM" and strictly less than "12:00 AM".

Thanks to one of these dispositions, said at least one datum indicates a time of day in a standard system.

According to one embodiment, the step of detecting a passing of time from said first period to said second period corresponds to a first passing, or a passing of time from said second period to said first period corresponds to a second passing.

Thanks to this disposition, said passing from day to night and from night to day, and preferably, said passing through midnight and said passing through noon, can be detected.

According to one embodiment, said detection of said passing of time comprises detecting a change of date.

Thanks to this disposition, said passing from day to night, and preferably, said passing through midnight, can be detected.

According to one embodiment, said change of date is detected by a change in the torque of said motor.

Thanks to this disposition, the change of date can be detected.

According to one embodiment, said correction comprises adding the difference to said time during or after the second passing.

Thanks to this disposition, the time can be set.

According to one embodiment, said addition controls the rotation of the motor.

Thanks to this disposition, the time is automatically corrected.

The present invention relates to a self-correcting watch comprising at least:

- A receiving member: said at least one receiving member being configured to receive said at least one datum;
- A detecting member: said at least one detecting member being configured to detect said passing of time between said first period and said second period; and
- A processing unit: said at least one processing unit being configured to calculate the difference between said time and said at least one received datum, in order to actuate said motor and to implement the method according to the invention.

Thanks to this disposition, the date and/or the time of said self-correcting watch can be corrected.

According to one embodiment, said at least one receiving member is configured to receive electromagnetic and/or light waves.

Thanks to this disposition, said at least one datum can be received.

BRIEF DESCRIPTION OF THE FIGURES

The invention will be described in more detail hereafter using the accompanying drawings, given as examples that are in no way limiting, wherein.

DETAILED DESCRIPTION OF THE INVENTION

Figure 1:
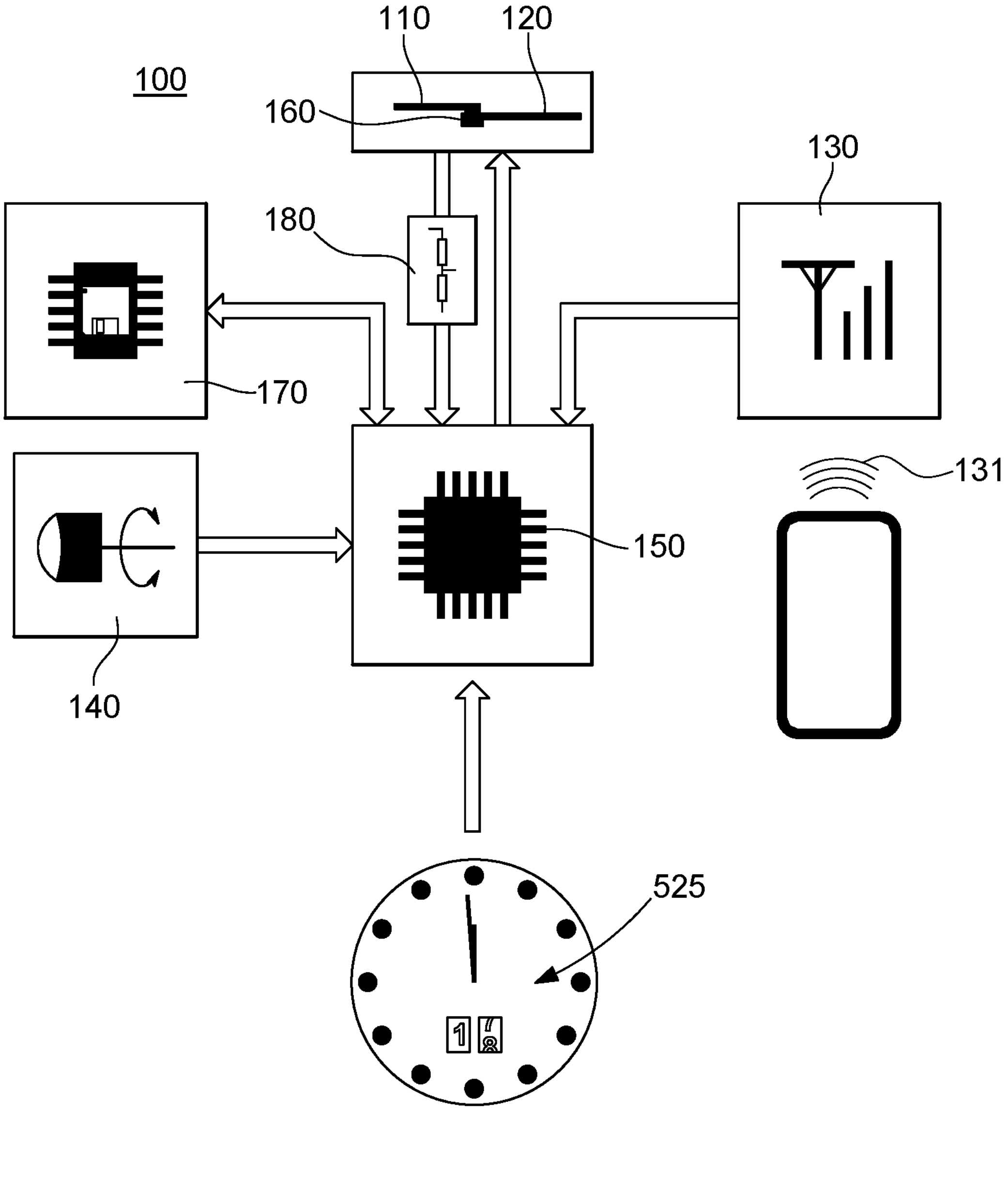
FIG. 1 shows a self-correcting watch 100 according to one embodiment.
Figure 2:
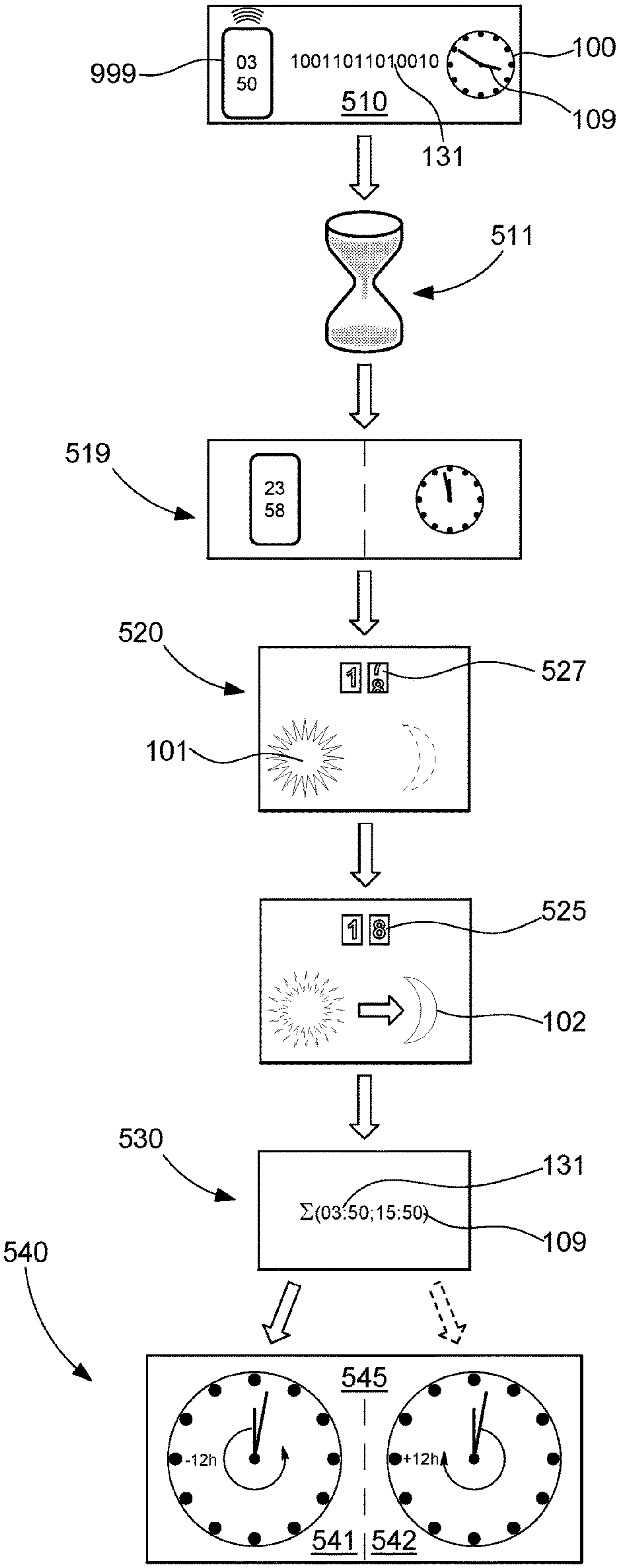
FIG. 2 shows a correction method 500 for a self-correcting watch 100 according to one embodiment.

The event is recurrent when the battery is changed, or when a watch is taken out of power-saving mode and the user has to set the time on his/her watch but does not know whether the time set 109 is before noon or after noon, known as ante-meridian or AM or post-meridian or PM.

The applicant proposes overcoming all or part of these drawbacks by means of a self-correcting watch 100 comprising at least one receiving member 130, at least one detecting member 170, and at least one processing unit 150 configured to implement a correction method 500.

More specifically, one purpose of the method according to the invention is to verify, during the first hours of operation of said self-correcting watch 100, that the set time 109 corresponds to the time of day when said self-correcting watch 100 was set or updated.

Conversely, if the set time 109 does not correspond to the time of day, then a correction is made by bringing the time forward 542 or backward 541.

For example, if a date leap 527 is detected 520 at noon, said correction method 500 brings the time backward 541 by 12 hours at noon on that day or at midnight on the next day.

If, conversely, said correction method 500 does not detect 520 the leap at midnight, said correction method 500 brings the time forward 542 by 12 hours at midnight to cause the date leap 527.

To this end, when said self-correcting watch 100 is powered on again, said at least one receiving member 130 receives 510 at least one datum 131, comprising at least one period of the day from among a first period 101 and a second period 102, by electromagnetic and/or light waves.

More particularly, said correction method 500, implemented by said at least one processing unit 150 receives 510 said at least one datum 131 via said at least one receiving member 130. Said at least one processing unit 150 can trigger the implementation of said correction method 500 following a battery replacement, for example.

Preferably, a smartphone 999 can be used to transmit said at least one datum 131 which comprises a time in a 24-hour time system or in a 12-hour time system, in other words a time with minutes and seconds in a standard system, and/or at least one date.

The user can set the time 101 using at least one setting member 140 by moving an hour hand 110 and/or a minute hand 120 to the desired time. Thus, the user indicates, with said hour hand 110, approximately the index "3", more precisely a space between the index "3" and "4", and with said minute hand 120, the index "10". However, it is impossible for the user to distinguish whether the set time 109 is "3:50 AM", i.e. a time which belongs, for example, to a first period 101 comprised between midnight and noon, or greater than or equal to "12:00 AM" and strictly less than "12:00 PM", or "3:50 PM", i.e. a time which belongs, for example, to a second period 102 comprised between midday and midnight or greater than or equal to "12:00 PM" and strictly less than "12:00 AM".

As time passes 511, said at least one datum 131, which was stored in a memory 160, is incremented with the time that passes, and the set time 109 rotates 519, in other words said at least one datum 131 and the set time 109 change with the time 519 in a similar manner.

At a passing of the time between said first period 101 and said second period 102, said correction method 500 detects 520 a torque change 527, resulting from the driving of the date disc 525 by said motor 160, via said at least one detecting member 170, which can take the form of a conventional divider bridge and thus said at least one processing unit 150, connected to said at least one detecting member 170, detects 520 a torque change 527 through the power consumption of said motor 160.

More specifically, if said self-correcting watch 100 changes the date 527, said at least one detecting member 170 detects 520 said passing of the set time 109 between said first period 101 and said second period 102, preferably said passing of time from said first period 101 to said second period 102. Depending on certain environmental conditions, such as temperature for example, it is possible that said passing through midnight is detected 520 by said at least one processing unit 150 with a delay of up to 40 minutes under extreme conditions.

Thus, said passing from day to night, and preferably said passing through midnight, is detected 520 and said at least one processing unit 150 calculates a difference 530, i.e. subtracts said time 109 set by the user from said at least one received datum 131.

If said difference 530 is zero, then said time 109 set by the user corresponds to said at least one received datum 131 and no action is taken by said at least one processing unit 150, or "0" is added to said set time 109. More specifically, the time 109 set by the user can differ from said at least one datum 131 by a few seconds or even a few minutes. In this instance, what matters is the difference between the unit of the hours of the set time 109 and the unit of the hours of said at least one datum 131; it is this difference 530 that is zero.

Conversely, if said difference 530 is not zero, then said at least one processing unit 150 corrects 540 said time as a function of the result of said difference 530. In other words, if said time 109 set by the user was "3:50 PM" and said at least one received datum 131 indicated "3:50 AM", said correction 540 will add 545 the difference 530 to said time during or after the second passing, i.e. "−12 hours", and thus said addition 545, more precisely, said at least one processing unit 150 will rotate said motor 160 counter-clockwise 541 to indicate noon, i.e. "12:00 PM" instead of midnight, i.e. 12:00 AM.

A second case is also provided for by the invention since, if said difference 530 is not zero and if said time 109 set by the user was "3:50 AM" and said at least one received datum 131 indicated "3:50 PM", said correction 540 will again add 545 the difference 530 to said time during or after the second passing, i.e. "+12 hours", and thus said addition 545, more precisely, said at least one processing unit 150 will rotate said motor 160 clockwise 542 to indicate midnight, i.e. 12:00 AM instead of noon, i.e. "12:00 PM"; the time is thus automatically corrected.

It should not be forgotten that these corrections 540 can be made later, during the day or at night, so as not to disturb the user, and said difference 530 can be made between said at least one datum 131 stored in memory and the set time 109 which have evolved over time 519: the result is identical.

Thus, the present invention allows said at least one datum 131 to be received via the smartphone 999 after replacing the battery or when changing time zone, and increases ease of use for the user.

The invention claimed is:

1. A correction method of a displayed time for a self-correcting watch; said self-correcting watch comprising an analog display of a time and of a date, at least one receiving member, at least one detecting member and at least one processing unit for implementing said correction method; said correction method comprising at least one:

- receiving at least one datum by said at least one receiving member; said at least one datum comprising a current time;
- detecting a passing of the time displayed by the watch at a given time between a first period and a second period by said at least one detecting member;
- calculating in the processing unit a difference between said given time and said current time incremented by a time interval measured from said receiving at least a datum until said detecting a passing of the time;
- correcting the time displayed by the analog display as a function of said difference calculated by said processing unit,
- wherein said detecting said passing of the time comprises detecting a change of date by detecting a change in the torque of a motor from driving of a date disc of said analog display.

2. The correction method according to claim 1, wherein said current time is provided in a 24-hour time system.

3. The correction method according to claim 2, wherein said second period is comprised between midnight and noon, or is greater than or equal to "12:00 AM" and strictly less than "12:00 PM" and said first period is comprised between noon and midnight or is greater than or equal to "12:00 PM" and strictly less than "00:00 AM".

4. A self-correcting watch comprising at least:

an analog display of a time and of a date;

a receiving member, said at least one receiving member being configured to receive at least one datum, said at least one datum comprising a current time;

a detecting member, said at least one detecting member being configured to detect a passing of the time displayed by the analog display at a given time between a first period and a second period; and, a processing unit, said at least one processing unit being configured to calculate a difference between said given time and said current time incremented by a time interval measured from a time of receiving said at least a datum until a time of detecting said passing of the time and correct the time displayed by the analog display as a function of said difference, wherein said detection of said passing of the time comprises detecting a change of date by detecting a change in the torque of a motor from driving of a date disc of said analog display.

5. The self-correcting watch according to claim 4, wherein said at least one receiving member is configured to receive electromagnetic and/or light waves.

* * * * *